United States Patent [19]
Moens et al.

[11] Patent Number: 5,596,037
[45] Date of Patent: Jan. 21, 1997

[54] CARBOXYL-TERMINATED POLYESTERS FOR THE PREPARATION OF POWDER COATING COMPOSITIONS

[75] Inventors: Luc Moens, Sint-Genesius-Rode; Daniel Maetens; Jean-Marie Loutz, both of Brussels; Michel Baudour, Angreau, all of Belgium

[73] Assignee: U C B S.A., Brussels, Belgium

[21] Appl. No.: 425,441

[22] Filed: Apr. 20, 1995

Related U.S. Application Data

[62] Division of Ser. No. 28,159, Mar. 9, 1993, Pat. No. 5,439,988.

[30] Foreign Application Priority Data

Mar. 16, 1992 [EP] European Pat. Off. .............. 92870044

[51] Int. Cl.$^6$ ..................................................... C08L 67/02
[52] U.S. Cl. ........................ 524/539; 525/438; 525/934
[58] Field of Search .................................. 525/438, 437, 525/934; 524/539

[56] References Cited

U.S. PATENT DOCUMENTS

| | | | |
|---|---|---|---|
| 3,624,180 | 11/1971 | Schmid et al. | 260/835 |
| 4,204,014 | 5/1980 | Dorffel et al. | 427/385.5 |
| 4,525,504 | 6/1985 | Morris et al. | 524/99 |
| 4,713,428 | 12/1987 | Maulhaupt et al. | 525/523 |
| 5,097,006 | 3/1992 | Kapilow | 528/272 |

FOREIGN PATENT DOCUMENTS 2140440  11/1984  United Kingdom.

OTHER PUBLICATIONS

Johnson et al., Proc. Water–Borne, Higher–Solids Powder Coat Sump. 6–8 Feb., 1991, pp. 65–77.

*Primary Examiner*—Patricia A. Short
*Attorney, Agent, or Firm*—Wenderoth, Lind & Ponack

[57] ABSTRACT

Carboxyl-terminated polyesters comprising the reaction products of (a) an aliphatic hydroxyl-terminated polyester prepared from 1,4-cyclohexanedicarboxylic acid and an alcohol component comprising
  (1) from 10 to 100 equivalent % of a cycloaliphatic diol and
  (2) from 90 to 0 equivalent % of a straight or branched chain aliphatic polyol having 2 to 12 carbon atoms, with (b) an aliphatic and/or aromatic dicarboxylic acid or the corresponding anhydride, process for preparing the same and the thermosetting powder compositions based on these polyesters and polyepoxy compounds used for the production of powder varnishes and paints. These polyesters provide coatings having an excellent weatherability combined with outstanding mechanical properties, even if curing takes place at low temperature.

17 Claims, No Drawings

CARBOXYL-TERMINATED POLYESTERS FOR THE PREPARATION OF POWDER COATING COMPOSITIONS

This application is a division of application Ser. No. 08/028,159, filed Mar. 9, 1993 (now U.S. Pat. No. 5,439,988).

The present invention relates to carboxyl-terminated polyesters, to thermosetting powder compositions based on these polyesters and epoxy compounds, as well as to a process for the preparation thereof. More particularly, the invention relates to thermosetting powder compositions which give coatings having a combination of outstanding properties, even if curing takes place at low temperature.

Thermosetting powder compositions are well known in the art and are widely used as paints and varnishes for coating of the most various articles. The advantages of these powders are numerous. On the one hand the problem of the solvents is entirely eliminated and on the other hand the powders are used without any loss, since only the powder in direct contact with the article is retained on the article, any excess powder being, in principle, entirely recoverable and reusable. This is why these powder compositions are preferred to coating compositions in the form of solutions in organic solvents.

The thermosetting powder compositions have already been widely used in the coating of household appliances, garden furniture, bicycles, automobile industry accessories and the like. They generally contain a thermosetting organic binder, fillers, pigments, catalysts and various additives to adapt their properties to their intended use.

There are principally two types of thermosetting powder compositions. On the one hand, there are those which contain as the binder a mixture of carboxyl group-containing polymers such as a carboxyl group-containing polyester or polyacrylate, and epoxy compounds, mainly triglycidyl isocyanurate and, on the other hand, those which contain as the binder a mixture of hydroxyl group-containing polymers, most often a hydroxyl group-containing polyester with phenol- or caprolactam-blocked isocyanates and the like.

The carboxyl-group containing polyesters which are suitable for the preparation of powder varnishes and paints are already the subject-matter of numerous publications in the form of articles and patents. In the patent literature, the U.S. Pat. Nos. 4,085,159 and 4,147,737 can in particular be mentioned. These polyesters are usually prepared from aromatic dicarboxylic acids, mainly terephthalic and isophthalic acid and optionally a minor proportion of aliphatic or cycloaliphatic dicarboxylic acids, and from various aliphatic polyols such as ethylene glycol, neopentyl glycol, 1,6-hexanediol, trimethylolpropane and the like. These polyesters generally have an acid number of 15 to 100 mg KOH/g of polyester. These polyesters based on aromatic dicarboxylic acids, when used together with epoxy compounds such as triglycidyl isocyanurate, provide thermosetting powder compositions which give paint or varnish coatings having excellent properties both as to their aspect and as to their mechanical properties (impact strength. flexibility, adherence and the like).

Quite recently, carboxyl-terminated and hydroxyl-terminated aliphatic polyesters have been proposed for the preparation of powder varnishes and paints, which have a better weatherability than the polyesters prepared from aromatic dicarboxylic acids.

Thus, according to U.S. Pat. No. 5,097,006 (assigned to the assignee of the present invention), an aliphatic polyester resin is prepared by reacting 1,4-cyclohexanedicarboxylic acid, as the sole acid component, with an alcohol component, which contains (1) from 12 to 100 equivalent % of hydrogenated bisphenol A and/or another cycloaliphatic diol and (2) from 88 to 0 equivalent % of at least one straight or branched chain aliphatic glycol or polyol. The preparation of these all-aliphatic polyesters takes place in one step, for example by reacting a molar excess of the acid component with respect to the alcohol component where a carboxyl-terminated polyester is prepared.

However, it has been found that it is absolutely necessary for these aliphatic polyesters to provide paint coatings having good mechanical properties (impact strength, flexibility), that the curing takes place at a temperature of 200° C. during 20 minutes and that a certain amount of a crosslinking catalyst, such as a phosphonium salt, is added to the coating composition. Indeed, at that temperature, without addition of such a catalyst, or at a lower curing temperature, for example at 180° C., even with addition of a catalyst, it is not possible to realize coatings having good mechanical properties from such aliphatic polyesters. Moreover, it has been found that even an increase of the amount of the crosslinking catalyst does not allow a lowering of the curing temperature. By crosslinking catalyst, there is meant here a compound that increases the reaction between the carboxyl groups of the polyester and the epoxy compound.

Consequently, these aliphatic polyesters do not give satisfaction unless these criteria (addition of crosslinking catalyst and curing time and temperature) are scrupulously respected. However, in industrial practice, it is very difficult to realize this condition of curing temperature. The least variation of the operating conditions of the oven will inevitably have repercussions on the quality of the obtained coating.

It would therefore be very advantageous to conceive carboxyl-terminated polyesters having all the advantageous properties of the aliphatic polyesters described in U.S. Pat. No. 5,097.006, and yet having a greater flexibility as regards the curing conditions required for the crosslinking of the coatings. This is what constitutes the object of the present invention.

According to the present invention, there are provided new carboxyl-terminated polyesters comprising the reaction products of (a) an aliphatic hydroxyl-terminated polyester prepared from 1,4-cyclohexanedicarboxylic acid and an alcohol component comprising
  (1) from 10 to 100 equivalent % of a cycloaliphatic diol and
  (2) from 90 to 0 equivalent % of at least one straight or branched chain aliphatic polyol having 2 to 12 carbon atoms, with (b) an aliphatic and/or aromatic dicarboxylic acid or the corresponding anhydride.

The carboxyl-terminated polyesters according to the invention have an acid number of from 25 to 70 mg KOH/g.

The essential characteristic of the carboxyl-terminated polyesters according to the invention which distinguishes them from the aliphatic polyesters prepared in U.S. Pat. No. 5,097,006 (assigned to the assignee of the present invention), is their preparation in two distinct steps. In the first step, a hydroxyl-terminated aliphatic polyester is prepared from 1,4-cyclohexanedicarboxylic acid, as the sole acid, and a cycloaliphatic diol, either alone or in admixture with aliphatic polyols. This hydroxyl-terminated polyester is thus exclusively composed of (cyclo)aliphatic compounds. i.e. it is prepared practically from the same starting materials as the aliphatic polyesters of the above-mentioned U.S. Patent. In the second step, this hydroxyl-terminated polyester is reacted with an aliphatic and/or aromatic dicarboxylic acid or the corresponding anhydride, so as to bring about a chain extension and a carboxylation of the polyester.

It has been unexpectedly found that by means of this particular process in two steps, a new carboxyl-terminated polyester is obtained, which, when used together with an epoxy compound such as triglycidyl isocyanurate, provides thermosetting powder compositions which give coatings having properties which are at least equivalent to those of the known aliphatic polyesters, even if the curing takes place under less severe heating conditions, i.e. at lower temperatures within the range of from 150° to 190° C. during about 10 minutes, while using a crosslinking catalyst, however, or when curing takes place at 200° C. for about 10 minutes, in the absence of a crosslinking catalyst.

First fact, this particular method of preparation of the polyester in two steps, as compared to the process in one step, confers more flexibility with regard to the temperature conditions in the curing of the coatings, since it allows the use of lower curing temperatures for the production of the coatings.

As shown in the following examples, it is not possible to obtain this result with the comparative polyesters prepared in one step from practically the same starting materials. It is neither possible to obtain this result with the polyesters of the above-mentioned U.S. Pat. No. 5,097,006.

It is obvious that this decrease of the curing temperature is economically and technically advantageous, since it brings about an economy of energy on the one hand and a more certain and constant quality of the final coatings on the other hand. Another interesting advantage is the possibility of coating substrates which are more sensitive to heat and thus broadening the field of application of this type of products.

Another advantageous characteristic of the invention is that the coatings prepared from the compositions containing the polyesters according to the invention have a combination of outstanding properties. Indeed, these coatings have at the same time the excellent properties of flexibility and of impact strength of the coatings obtained from the classical polyesters based on aromatic acids and the excellent weatherability, which is the characteristic of coatings obtained from all-aliphatic polyesters, and all this without having to proceed to a curing at the very high temperature of 200° C. Moreover, these coatings have an excellent resistance to the polluting industrial atmospheres and to corrosion, a resistance which is substantially higher than that of the coatings obtained from a polyester of identical composition, but which is prepared in one step (example 32).

The present invention relates also to the process of preparation of these new polyesters. According to this process, an all-aliphatic hydroxyl-terminated polyester is prepared in a first step.

For the preparation of this aliphatic hydroxyl-terminated polyester, 1,4-cyclohexanedicarboxylic acid is exclusively used as the acid component; in general, this acid is present in the form of a mixture of the cis and trans isomers. The alcohol component contains from 10 to 100 equivalent %, preferably from 30 to 70 equivalent %, of a cycloaliphatic diol. Examples of such cycloaliphatic diols are 2,2-bis(4-hydroxycyclohexyl)propane (or hydrogenated bisphenol A), 1,4-cyclohexanedimethanol, 1,4-cyclohexanediol, 2,2,4,4-tetramethyl-1,3-cyclobutanediol, 4,8-bis(hydroxymethyl) tricyclo[5.2.1.0$^{2,6}$]decane (or tricyclodecanedimethanol) and their mixtures. The alcohol component may further contain from 0 to 90 equivalent %, preferably from 30 to 70 equivalent % of straight or branched chain aliphatic polyols having 2 to 12 carbon atoms. These polyols may be glycols or tri- or tetrahydric polyols, such as ethylene glycol, diethylene glycol, propylene glycol, 1,4-butanediol, 1,6-hexanediol, neopentyl glycol, trimethylolpropane, ditrimethylolpropane, trimethylolethane, pentaerythritol, 1,3,5-tris(2-hydroxyethyl)-1,3,5-triazine-2,4,6(1H,3H,5H)-trione (or tris(2-hydroxyethyl)-isocyanurate) and their mixtures.

Mixtures of neopentyl glycol and tri- or tetrahydric aliphatic polyols are particularly preferred according to the present invention. Neopentyl glycol allows obtaining an appropriate glass transition temperature and makes it easier to obtain a good melt viscosity of the powder, whereas the tri- or tetrahydric polyols produce polyesters with a functionality higher than two. The ratio of hydroxyl equivalents of the neopentyl glycol to hydroxyl equivalents of the tri- or tetrahydric polyols is generally of from 0:1 to 30:1.

The hydroxyl-terminated aliphatic polyester is prepared by conventional methods. Generally, an excess of from 7 to 85 equivalent % of the alcohol component is used with respect to the 1,4-cyclohexanedicarboxylic acid; a polyester is thus obtained with a hydroxyl number that may vary from 30 to 220 mg KOH/g of polyester.

According to the invention, there is then prepared in a second step a carboxyl-terminated polyester by reacting the hydroxyl-terminated polyester obtained in the first step of the process with an aliphatic and/or aromatic dicarboxylic acid or the corresponding anhydride to obtain chain extension and/or the carboxylation of the polyester. As acids (or anhydrides) suitable for the preparation of the carboxyl-terminated polyester in the second step, the following acids or anhydrides may be mentioned: succinic acid, glutaric acid, adipic acid, pimelic acid, azelaic acid, maleic acid, fumaric acid, isophthalic acid, succinic anhydride, maleic anhydride and mixtures thereof. Among the previously mentioned acids, adipic acid and isophthalic acid are preferably used.

It should be noticed that it is also possible to use in the second step of the process a mixture of the aliphatic and/or aromatic dicarboxylic acid (or the corresponding anhydride) with 80 equivalent % (based on the total of acids and/or anhydrides) of a tricarboxylic aromatic anhydride such as trimellitic anhydride.

The carboxyl-terminated polyester is prepared by using an excess of the aliphatic and/or aromatic dicarboxylic acid or the corresponding anhydride with respect to the hydroxyl-terminated polyester: this excess is generally of from 20 to 100 equivalent %. A carboxyl-terminated polyester is thus obtained with an acid number of from 25 to 70 mg KOH/g of polyester. This polyester has a functionality which is preferably from 2 to 4.

The carboxyl-terminated polyesters according to the invention are solid products which have a number-average molecular weight between 2,000 and 10,000. In the liquid state, these products have a viscosity measured at 200° C. by means of a cone/plate viscosimeter (ICI viscosity) of from 1,000 to 15,000 mPa.s.

As a general rule, the carboxyl-terminated polyesters of the present invention contain an amount of from 50 to 90 mole % of 1,4-cyclohexanedicarboxylic acid with respect to the total amount of carboxylic acids.

For the preparation of the polyesters, a conventional reactor is generally used, equipped with a stirrer, an inert gas (nitrogen) inlet, a distillation column connected to a water-cooled condenser and a thermometer connected to a thermoregulator.

The esterification conditions used for the preparation of the polyesters are conventional, namely a conventional esterification catalyst, such as dibutyltin oxide, dibutyltin dilaurate, n-butyltin trioctanoate, sulfuric acid or a sulfonic acid, can be used in an amount of 0.05 to 0.5% by weight of the reactants, and optionally color stabilizers, for example phenolic antioxidants such as IRGANOX 1010 (CIBA-GEIGY) or phosphonite or phosphite type stabilizers such as tributyl phosphite can be added.

The polyesterification is generally carried out at a temperature which is gradually increased from 130° C. to about 190° to 230° C., first under normal pressure, then under reduced pressure at the end of each step of the process, while maintaining these operating conditions until a polyester is obtained which has the desired hydroxyl and/or acid number. The degree of esterification is followed by the determination of the amount of water formed in the course of the reaction and of the properties of the obtained polyester, for example the hydroxyl number, the acid number, the molecular weight or the viscosity.

When polyesterification is complete, a crosslinking catalyst is optionally added to the polyester while it is still in the molten state: this catalyst facilitates the reaction between the carboxyl groups of the polyester and the epoxy compounds. These catalysts are added with the aim of accelerating the crosslinking of the thermosetting powder composition during curing. As examples of such catalysts there may be mentioned amines (e.g. 2-phenylimidazoline), phosphines (e.g. triphenylphosphine), ammonium salts (e.g. tetrabutylammonium bromide, tetrapropylammonium chloride), and phosphonium salts (e.g. ethyltriphenylphosphonium bromide or benzyltriphenylphosphonium chloride). These catalysts are necessary in order to obtain final coatings having satisfactory mechanical properties, when curing takes place at temperatures below 200° C., for example from 150° to 190° C. If curing takes place at 200° C., the catalysts may be omitted. These catalysts are preferably used in an amount of 0 to 1% by weight with respect to the weight of the polyester.

At the end of the synthesis, the carboxyl-terminated polyester is cast into a thick layer, allowed to cool and then ground into particles having an average size of a fraction of a millimeter up to a few millimeters.

The polyesters according to the invention are mainly used as binders, together with epoxy compounds, for the preparation of thermosetting powder compositions especially useful as varnishes and paints suitable for an application according to the coating technique by means of an electrostatic or triboelectric spray gun or according to the fluidized bed coating technique.

Thus, the present invention also relates to thermosetting powder compositions comprising (a) a carboxyl-terminated polyester according to the invention and (b) a polyepoxy compound.

The present invention further relates to the use of the thermosetting compositions according to the invention for the preparation of powder varnishes and paints, as well as to the powder varnishes and paints obtained by means of these compositions.

The invention finally also relates to a process for coating an article, preferably of metal, which comprises applying to said article a thermosetting powder composition according to the invention by spray coating with an electrostatic or a triboelectric gun or by coating from a fluidized bed, followed by curing the coating thus obtained at a temperature of from 150° to 200° C. for a period of 10 to 30 minutes.

The polyepoxy compounds that can be used for the preparation of the thermosetting powder compositions according to the invention are the conventional polyepoxy compounds used in this type of compositions. Compounds of this type are for example described in U.S. Pat. No. 4,085,159.

The preferred polyepoxy compounds are solid products at room temperature and contain on average at least two epoxy groups per molecule, such as the solid epoxy resins based on bisphenol A and epichlorohydrin, i.e. the diglycidyl ether of bisphenol A and its addition products with a higher molecular weight. Examples of such epoxy resins are the Epikote resins commercialized by the SHELL Company, the Araldite resins commercialized by CIBA-GEIGY Corporation, like this sold under the tradename Araldite GT 7004, the DER resins marketed by the DOW CHEMICAL Company and the like. A particularly preferred polyepoxy compound is triglycidyl isocyanurate such as sold by CIBA-GEIGY Corporation under the tradename Araldite PT 810.

The polyepoxy compound my be used in an amount of from 0.7 to 1.3, preferably from 0.95 to 1.05 equivalent of epoxy groups per equivalent of carboxyl groups in the carboxyl-terminated polyester. The amount of epoxy compound varies according to the nature of the polyepoxy compound. If triglycidyl isocyanurate is used, the thermosetting powder composition preferably contains from 4 to 15 parts by weight of this compound per 100 parts by weight of binder, i.e. polyester plus epoxy compound.

For the preparation of the thermosetting powder compositions, the carboxyl-terminated polyester, the polyepoxy compound and various auxiliary substances conventionally used for the manufacture of powder paints and varnishes are mixed homogeneously. This homogenization is carried out for example by melting the polyester, the polyepoxy compound and the various auxiliary substances at a temperature within the range of from about 90° to 100° C., preferably in an extruder, for example a Buss-Ko-Kneter extruder or a twin-screw extruder of the Werner-Pfleiderer or Baker Perkins type. The extrudate is then allowed to cool, is ground and sieved to obtain a powder, the particle size of which is between 30 and 110 micrometers.

The auxiliary substances which can be added to the thermosetting compositions according to the invention are among others ultraviolet light absorbing compounds such as Tinuvin 900 (from CIBA-GEIGY Corp.), light stabilizers based on sterically hindered amines (for example Tinuvin 144 from CIBA-GEIGY Corp.), phenolic antioxidants (for example Irganox 1010 or Irgafos P-EPQ from CIBA-GEIGY Corp.) and stabilizers of the phosphonite or phosphite type. The compositions according to the invention my contain up to 10% by weight thereof with respect to the weight of the polyester. A variety of pigments my also be added to the thermosetting compositions according to the invention. As examples of pigments there my be mentioned metal oxides such as titanium dioxide, iron oxide, zinc oxide and the like, metal hydroxides, metal powders, sulfides, sulfates, carbonates, silicates such as aluminum silicate, carbon black, talc, china clays, barytes, iron blues, lead blues, organic reds, organic maroons and the like. As auxiliary substances there may also be mentioned flow control agents such as Resiflow PV5 (from WORLEE), Modaflow (from MONSANTO), Acronal 4F (from BASF), plasticizers such as dicyclohexyl phthalate, triphenyl phosphate, grinding aids, drying oils, degassing agents such as benzoin and fillers. These auxiliary substances are added in conventional amounts, it being understood that if the thermosetting compositions according to the invention are used as varnishes, opacifying auxiliary substances should be omitted.

The powder paints and varnishes which are the subject matter of the present invention are suitable to be applied on articles to be coated by conventional techniques, i.e. by application by means of an electrostatic or triboelectric spray gun or by the well-known fluidized bed coating technique.

After having been applied on the article in question, the deposited coatings are cured by heating in an oven at a temperature of from 150° to 200° C., for a period of about 10 to 30 minutes, in order to obtain a complete crosslinking of the coating.

The examples which follow illustrate the invention without limiting it. In these examples, all parts are by weight unless otherwise indicated.

In tables I and II, the different compounds used for the preparation of the polyesters according to the invention and the polyesters used for comparison are designated by the following abbreviations:

CHDA: 1,4-cyclohexanedicarboxylic acid
IPA: isophthalic acid
ADA: adipic acid
SA: succinic acid
TMA: trimellitic anhydride
HBPA: hydrogenated bisphenol A
CHDM: 1,4-cyclohexanedimethanol
TCDDM: tricyclodecanedimethanol
TMCBD: 2,2,4,4-tetramethyl-1,3-cyclobutanediol
THEIC: tris(2-hydroxyethyl)-isocyanurate
NPG: neopentylglycol
TMP: trimethylolpropane
DTMP: di-trimethylolpropane
PE: pentaerythritol
TGIC: triglycidyl isocyanurate In these examples, when a crosslinking catalyst is used, this is ethyltriphenylphosphonium bromide and when an antioxidant is used, this is tributyl phosphite. The glass transition temperature (Tg) is determined by differential scanning calorimetry (DSC) with an increase of temperature of 20° C. per minute.

EXAMPLE 1

Preparation of a Carboxyl-Terminated Polyester in Two Steps, with Chain Extension and Carboxylation by Means of Isophthalic Acid in the Second Step 1st step.

215 parts of hydrogenated bisphenol A, 215 parts of neopentyl glycol, 37 parts of trimethylolpropane and 502 parts of 1,4-cyclohexanedicarboxylic acid together with 3 parts of n-butyltin trioctanoate, as an esterification catalyst, are introduced in a four-necked round-bottomed flask equipped with a stirrer, a distillation column attached to a water-cooled condenser, a nitrogen inlet and a thermometer connected to a thermoregulator. The mixture is heated under nitrogen with stirring to a temperature of about 135° C., at which point the water formed is distilled off from the flask. The heating is gradually increased to reach a temperature of 225° C. When distillation has ceased under atmospheric pressure, a vacuum of 50 mm Hg is gradually established. The reaction mixture is maintained for a further two hours at 225° C. and under a pressure of 50 mm Hg. The hydroxyl-terminated polyester thus obtained is then cooled to 200° C.; it presents the following characteristics:

Hydroxyl number: 66 mg KOH/g
Acid number: 5 mg KOH/g.

2nd step.

151 parts of isophthalic acid are added to the polyester obtained in the first step, while it is still at 200° C. The mixture is heated to 225° C. After two hours heating at 225° C. under atmospheric pressure, a vacuum of 50 mm Hg is gradually established. After one hour heating at 225° C. under a vacuum of 50 mm Hg, the polyester, while still in the molten state, is poured out and allowed to cool. The carboxyl-terminated polyester thus obtained has the following characteristics:

Acid number: 51 mg KOH/g
Hydroxyl number: 2 mg KOH/g
ICI viscosity at 200° C.: 6,800 mPa.s
Tg (DSC): 52° C.
Reactivity at 180° C. (DIN 55 990) for a polyester/TGIC mixture with a ratio by weight of 90:10: 240 seconds.

EXAMPLE 2

Preparation of a Carboxyl-Terminated Polyester in Two Steps with Chain Extension and Carboxylation by Means of Adipic Acid in the Second Step 1st step.

A polyester is prepared according to the procedure of the first step of example 1 by reacting a mixture of 391 parts of hydrogenated bisphenol A, 130 parts of neopentyl glycol, 22 parts of trimethylolpropane and 474 parts of 1,4-cyclohexanedicarboxylic acid together with 3 of parts n-butyltin trioctanoate as the esterification catalyst. The hydroxyl-terminated polyester obtained has the following characteristics:

Hydroxyl number: 51 mg KOH/g
Acid number: 3 mg KOH/g.

2nd step.

The polyester obtained in the first step is reacted with 93 parts of adipic acid. The procedure of the second step of example 1 is followed until a carboxyl-terminated polyester is obtained, which has the following characteristics:

Acid number: 34 mg KOH/g
Hydroxyl number: 3 mg KOH/g
ICI viscosity at 200° C.: 9,550 mPa.s
Tg (DSC): 55° C.
Reactivity at 180° C. (DIN 55 990) for a polyester/TGIC mixture with a ratio by weight of 93:7: 450 seconds.

EXAMPLE 3

The procedure of Example 2 is followed, but 2 parts of a crosslinking catalyst are added to the carboxyl-terminated polyester obtained at the end of the synthesis, while it is still at 200° C. The reactivity of the thus prepared polyester, when mixed with TGIC in the ratio by weight of 93:7 and measured at 180° C. according to DIN 55 990 is 95 seconds.

EXAMPLE 4

Preparation of a Carboxyl-Terminated Polyester in Two Steps, with Carboxylation by Means of Succinic Anhydride 1st step.

In the same apparatus as used in example 1, there are introduced 146 parts of neopentyl glycol, 341 parts of hydrogenated bisphenol A, 40 parts of trimethylolpropane and 426 parts of 1,4-cyclohexanedicarboxylic acid, together with 2 parts of n-butyltin trioctanoate as the esterification catalyst. While stirring, the mixture is heated under nitrogen to a temperature of 225° C. When distillation has ceased and the temperature at the head of the column is lower than 80° C., a vacuum of 50 mm Hg is gradually established, until a hydroxyl-terminated polyester is obtained, which has the following characteristics:

Hydroxyl number: 55 mg KOH/g

Acid number: 5 mg KOH/g

2nd step.

The reaction mixture is allowed to cool to 180° C. and 81 parts of succinic anhydride are added thereto. Reaction is continued for two hours. The carboxyl-terminated polyester thus obtained has the following characteristics:

Acid number: 53 mg KOH/g

Hydroxyl number: 5 mg KOH/g

ICI viscosity at 200° C.: 3,800 mPa.s

Tg (DSC): 52° C.

Reactivity at 180° C. (DIN 55 990) for a polyester/TGIC mixture with a ratio by weight of 90:10: 200 seconds.

EXAMPLES 5 TO 19

Adopting the procedure of example 1, a series of other carboxyl-terminated polyesters are prepared (examples 5 to 11 and 13 to 19). The carboxyl-terminated polyester of example 12 is prepared according to the method of example 4. These different polyesters are described in Table I, wherein the following data are successively given: the composition (in parts by weight) of the hydroxyl-terminated polyester prepared in the first step, the amount of n-butyltin trioctanoate when used as the esterification catalyst, the amount of antioxidant when used, the hydroxyl number and acid number of the resulting hydroxyl-terminated polyester, the composition (in parts by weight) of the carboxyl-terminated polyester prepared in the second step, as well as the amount of crosslinking catalyst when added at the end of the synthesis while the polyester is still in the molten state, the acid number and hydroxyl number, the ICI viscosity at 200° C. in mPa.s, the color according to the Gardner scale, the glass transition temperature (Tg determined by DSC) and the reactivity at 180° C. (DIN 55 990) of the final polyester, this last property being measured for a polyester/TGIC mixture with a ratio by weight of 93:7 when the polyester has an acid number of about 30 mg KOH/g, and a ratio by weight of 90:10 when the polyester has an acid number of about 50 mg KOH/g.

TABLE I

| | Ex. 5 | Ex. 6 | Ex. 7 | Ex. 8 | Ex. 9 |
|---|---|---|---|---|---|
| First step | | | | | |
| CHDA | 586 | 453 | 518 | 506 | 432 |
| NPG | 249 | 121 | 208 | 197 | 135 |
| HBPA | | 364 | | 99 | 405 |
| CHDM | | | | 99 | |
| TMCBD | 166 | | | | |
| TCDDM | | | 208 | | |
| TMP | 23 | 38 | 37 | | |
| DTMP | | | | 20 | |
| THEIC | | | | | 69 |
| Esterification catalyst | 2.3 | 2.2 | 2.2 | 2.2 | 2.3 |
| Antioxidant | 0.9 | 1.0 | 0.9 | 0.9 | 1.0 |
| Hydroxyl No. (mg KOH/g) | 53 | 65 | 63 | 59 | 65 |
| Acid No. (mg KOH/g) | 4 | 7 | 6 | 2 | 8 |
| Second step | | | | | |
| IPA | 111 | | 150 | 150 | |
| ADA | | 134 | | | 134 |
| Crosslinking catalyst | | 1.0 | | 1.5 | |
| Acid No. (mg KOH/g) | 33 | 52 | 49 | 47 | 52 |
| Hydroxyl No. (mg KOH/g) | 3 | 2 | 2 | 3 | 1 |
| ICI viscosity at 200° C. (mPa · s) | 5,000 | 2,000 | 4,000 | 4,700 | 1,500 |
| Color (Gardner) | 1 | 1 | 1 | 1 | 1 |
| Tg (°C.) | 52 | 49 | 52 | 50 | 48 |
| Reactivity at 180° C. (sec) | 450 | 125 | 390 | 111 | 125 |

| | Ex. 10 | Ex. 11 | Ex. 12 | Ex. 13 | Ex. 14 |
|---|---|---|---|---|---|
| First step | | | | | |
| CHDA | 495 | 335 | 571 | 474 | 448 |
| NPG | 125 | 217 | 240 | 186 | 120 |
| HBPA | 250 | 217 | 120 | 279 | 360 |
| TMCBD | 125 | | | | |
| TCDDM | | | 119 | | |
| TMP | | 35 | | 24 | 37 |
| DTMP | 20 | | | | |
| PE | | | 12 | | |
| Esterification catalyst | | 2.2 | 2.4 | 2.2 | 2.2 |
| Antioxidant | | 0.9 | 1.0 | 1.0 | 0.9 |
| Hydroxyl No. (mg KOH/g) | 49 | 53 | 30 | 57 | 64 |
| Acid No. (mg KOH/g) | 2 | 5 | 2 | 3 | 5 |
| Second step | | | | | |
| IPA | | 314 | | 151 | 71 |
| ADA | 98 | | | | 71 |
| SA | | | 53 | | |
| Crosslinking catalyst | | 0.7 | 1.8 | 1.1 | 1.3 |
| Acid No. (mg KOH/g) | 32 | 52 | 28 | 54 | 51 |
| Hydroxyl No. (mg KOH/g) | 3 | 3 | 3 | 4 | 1 |
| ICI viscosity at 200° C. (mPa · s) | 5,200 | 8,100 | 6,500 | 4,600 | 3,000 |
| Color (Gardner) | 1 | 2 | 1 | 2 | 1 |
| Tg (°C.) | 54 | 65 | 55 | 63 | 56 |
| Reactivity at 180° C. (sec) | 420 | 115 | 460 | 120 | 300 |

| | Ex. 15 | Ex. 16 | Ex. 17 | Ex. 18 | Ex. 19 |
|---|---|---|---|---|---|
| First step | | | | | |
| CHDA | 530 | 557 | 539 | 385 | 445 |
| NPG | 232 | 221 | 117 | 137 | 245 |
| HBPA | 232 | 111 | 117 | 412 | 245 |
| CHDM | | 111 | 235 | | |
| TMP | 22 | 22 | 22 | | |
| Esterification catalyst | | 2.3 | 2.3 | 2.2 | |
| Antioxidant | | 0.9 | 0.9 | 0.9 | 0.9 |
| Hydroxyl No. (mg KOH/g) | 44 | 47 | 45 | 112 | 113 |
| Acid No. (mg KOH/g) | 3 | 4 | 2 | 7 | 8 |
| Second step | | | | | |
| IPA | 105 | | | 105 | 108 |
| ADA | | | 93 | 96 | |
| TMA | | | | 72 | 72 |
| Crosslinking catalyst | 1.1 | | 1.6 | 0.3 | |
| Acid No. (mg KOH/g) | 32 | 34 | 33 | 52 | 52 |
| Hydroxyl No. (mg KOH/g) | 3 | 3 | 2 | 5 | 7 |

TABLE I-continued

| | | | | | |
|---|---|---|---|---|---|
| KOH/g) | | | | | |
| ICI viscosity at 200° C. (mPa · s) | 16,000 | 6,800 | 3,200 | 5,000 | 5,200 |
| Color (Gardner) | 1 | 1 | 2 | 1 | 1 |
| Tg (°C.) | 65 | 60 | 49 | 55 | 63 |
| Reactivity at 180° C. (sec) | 120 | 420 | 111 | 125 | 170 |

EXAMPLE 20 (COMPARATIVE)

Preparation of a Carboxyl-Terminated Polyester in a Single Step 215 parts of hydrogenated bisphenol A, 215 parts of neopentyl glycol, 20 parts of trimethylolpropane, 500 parts of 1,4-cyclohexanedicarboxylic acid and 151 parts of isophthalic acid, together with 3 parts of n-butyltin trioctanoate as catalyst, are introduced in the same apparatus as used in example 1. The mixture is heated under nitrogen while stirring to a temperature of 225° C. When distillation has ceased and the temperature at the head of the column is lower than 80° C., a vacuum of 50 mm Hg is gradually established. After two hours at 225° C. and under a pressure of 50 mm Hg, pressure is allowed to rise to atmospheric pressure and the polyester is poured out while still in the molten state and allowed to cool. The carboxyl-terminated polyester thus obtained has the following characteristics:

Acid number: 50 mg KOH/g

Hydroxyl number: 3 mg KOH/g

ICI viscosity at 200° C.: 7,000 mPa.s

Tg (DSC): 55° C.

Reactivity at 180° C. (DIN 55 990) for a polyester/TGIC mixture with a ratio by weight of 90:10: 340 seconds.

EXAMPLE 21 (COMPARATIVE)

The procedure of example 20 is followed, but 1 part of a crosslinking catalyst is added to the carboxyl-terminated polyester obtained at the end of the synthesis, while it is still at 200° C. The reactivity of the polyester thus obtained, measured as in example 20, is 115 seconds.

EXAMPLES 22 TO 29 (COMPARATIVE)

According to the procedure of example 20, eight further carboxyl-terminated polyesters are prepared in one step and are introduced by way of comparison.

In table II, there are successively indicated the composition (in parts by weight) of the carboxyl-terminated polyester, the amount of n-butyltin trioctanoate used as the esterification catalyst, the amount of antioxidant added, the amount of crosslinking catalyst when added at the end of the synthesis while the polyester is still in the molten state, the acid number and hydroxyl number, the ICI viscosity at 200° C. in mPa.s, the color according to the Gardner scale, the glass transition temperature (Tg, determined by DSC) and the reactivity at 180° C. (DIN 55 990) of the polyester, this last property being measured for a polyester/TGIC mixture with a ratio by weight of 93:7 when the polyester has an acid number of about 30 mg KOH/g and with a ratio by weight of 90:10 when the polyester has an acid number of about 50 mg KOH/g.

In the examples 28 and 29, the polyesters exclusively contain 1,4-cyclohexanedicarboxylic acid as the acid component. The composition of these carboxyl-terminated polyesters corresponds to the aliphatic polyesters described in the U.S. Pat. No. 5,097,006 (assigned to the assignee of the present invention).

TABLE II

| | Ex. 22 | Ex. 23 | Ex. 24 | Ex. 25 |
|---|---|---|---|---|
| CHDA | 452 | 452 | 501 | 501 |
| ADA | 134 | 134 | | |
| IPA | | | 151 | 151 |
| NPG | 122 | 122 | 215 | 215 |
| HBPA | 365 | 365 | 215 | 215 |
| TMP | 23 | 23 | 27 | 27 |
| Esterification catalyst | 2.2 | 2.2 | 2.2 | 2.2 |
| Antioxidant | 1.0 | 1.0 | 1.0 | 1.0 |
| Crosslinking catalyst | | 1.2 | | 0.9 |
| Acid No. (mg KOH/g) | 52 | 52 | 50 | 50 |
| Hydroxyl No. (mg KOH/g) | 4 | 4 | 4 | 4 |
| ICI viscosity at 200° C. (mPa · s) | 5,400 | 5,400 | 7,000 | 7,000 |
| Color (Gardner) | 1 | 2 | 1 | 1 |
| Tg (°C.) | 48 | 48 | 55 | 55 |
| Reactivity at 180° C. (sec) | 515 | 120 | 340 | 115 |

| | Ex. 26 | Ex. 27 | Ex. 28 | Ex. 29 |
|---|---|---|---|---|
| CHDA | 530 | 530 | 600 | 559 |
| IPA | 105 | 105 | | |
| NPG | 232 | 232 | 144 | 144 |
| HBPA | 232 | 232 | 334 | 333 |
| TMP | | | 24 | 24 |
| Esterification catalyst | 2.3 | 2.3 | 2.5 | 2.5 |
| Antioxidant | 1.0 | 1.0 | 1.0 | 1.0 |
| Crosslinking catalyst | | 2.0 | | 1.5 |
| Acid No. (mg KOH/g) | 32 | 32 | 53 | 53 |
| Hydroxyl No. (mg KOH/g) | 3 | 2 | 2 | 1 |
| ICI viscosity at 200° C. (Mpa · s) | 10,000 | 10,000 | 6,400 | 6,60 |
| Color (Gardner) | 2 | 2 | 1 | 1 |
| Tg (°C.) | 56 | 56 | 59 | 58 |
| Reactivity at 180° C. (sec) | 660 | 110 | 605 | 250 |

EXAMPLE 30

Preparation of Thermosetting Powder Compositions and Characteristics of the Coatings Obtained Therewith Pigmented powders suitable for the production of coatings by spraying with an electrostatic spray gun are prepared from the polyesters according to the invention obtained in examples 1 to 19 and from the polyesters not according to the invention, obtained in examples 20 to 29. For the polyesters having an acid number of 30 mg KOH/g, the polyester and triglycidyl isocyanurate (crosslinking agent) are used in a ratio by weight of 93:7. A typical composition is the following:

polyester: 558 parts triglycidyl isocyanurate (Araldite PT810 from CIBA-GEIGY): 42 parts titanium dioxide (Kronos CL2310): 400 parts flow control agent (Resiflow PV5 from WORLEE): 10 parts degassing agent (benzoin from BASF): 3.5 parts.

For the polyesters having an acid number of 50 mg KOH/g, the polyester and triglycidyl isocyanurate (crosslinking agent) are used in a ratio by weight of 90:10. A typical composition is the following:

polyester: 540 parts triglycidyl isocyanurate (Araldite PT810 from CIBA-GEIGY): 60 parts titanium dioxide (Kronos CL2310): 400 parts flow control agent (Resiflow PV5 from WORLEE): 10 parts degassing agent (benzoin from BASF): 3.5 parts.

These powders are prepared by mixing and homogenizing the various ingredients in a Baker-Perkins twin-screw extruder, at a temperature of 100° C. After cooling, the mixture is ground in a pin-disc mill and sieved to a particle size of 10 to 110 micrometers.

The powders thus obtained are applied by means of an electrostatic spray gun on untreated cold rolled steel panels with a film thickness of 50 to 80 micrometers. The coatings deposited are then cured for a period of 10 minutes at a temperature of either 200° C., 180° C. or 160° C. The thus cured coatings are then subjected to conventional tests. The results obtained are reported in Table III for the polyesters of examples 1 to 19 according to the invention and in Table IV for the polyesters of examples 20 to 29, not according to the invention.

In Tables III and IV:

the 1st column gives the number of the example of preparation of the polyester used in the tested formulation, the 2nd column gives the ratio by weight of polyester to triglycidyl isocyanurate, the 3rd column, the percentage by weight of crosslinking catalyst when present in the polyester, the 4th column, the curing temperature in °C. (real temperature of the article to be coated), the 5th column the gloss value at an angle of 60°, in %, according to ASTM D 523, the 6th column the behavior of the coating on bending on a conical mandrel of 3 mm, according to ASTM D 522, the 7th column, the resistance to reverse impact, in kg.cm, according to ASTM D 2794, the 8th column, the resistance to direct impact, in kg.cm, according to ASTM D 2794, the 9th column, the value obtained in the Erichsen embossing test, according to the ISO 1520 standard.

TABLE III

Characteristics of the paint coatings.

| Polyester of example No. | Polyester/ TGIC ratio | % by weight of crosslinking catalyst | Curing temperature (°C.) | Gloss at 60° (%) | Conical mandrel | Reverse impact (kg · cm) | Direct impact (kg · cm) | Erichsen embossing (mm) |
|---|---|---|---|---|---|---|---|---|
| 1  | 90/10 |      | 200 | 86 | passes | 80 | 80 | 9.0 |
| 2  | 93/7  |      | 200 | 86 | passes | 80 | 80 | 9.9 |
| 3  | 93/7  | 0.2  | 160 | 88 | passes | 80 | 80 | 9.5 |
| 4  | 90/10 |      | 200 | 91 | passes | 80 | 80 | 10.1 |
| 5  | 93/7  |      | 200 | 86 | passes | 80 | 80 | 9.0 |
| 6  | 90/10 | 0.1  | 160 | 83 | passes | 80 | 80 | 10.5 |
| 7  | 90/10 |      | 200 | 84 | passes | 80 | 80 | 9.7 |
| 8  | 90/10 | 0.15 | 180 | 88 | passes | 80 | 80 | 9.5 |
| 9  | 90/10 |      | 200 | 82 | passes | 80 | 80 | 9.5 |
| 10 | 93/7  |      | 200 | 86 | passes | 80 | 80 | 9.7 |
| 11 | 90/10 | 0.07 | 180 | 87 | passes | 80 | 80 | 9.0 |
| 12 | 93/7  | 0.18 | 180 | 87 | passes | 80 | 80 | 9.0 |
| 13 | 90/10 | 0.11 | 160 | 87 | passes | 80 | 80 | 8.7 |
| 14 | 90/10 | 0.13 | 180 | 84 | passes | 80 | 80 | 9.2 |
| 15 | 93/7  | 0.11 | 180 | 88 | passes | 80 | 80 | 9.0 |
| 16 | 93/7  |      | 200 | 88 | passes | 80 | 80 | 9.7 |
| 17 | 93/7  | 0.16 | 180 | 89 | passes | 80 | 80 | 10.8 |
| 18 | 90/10 | 0.03 | 180 | 86 | passes | 80 | 80 | 10.0 |
| 19 | 90/10 |      | 200 | 86 | passes | 80 | 80 | 9.8 |

TABLE IV

Characteristics of the paint coatings (for comparison).

| Polyester of example No. | Polyester/ TGIC ratio | % by weight of crosslinking catalyst | Curing temperature (°C.) | Gloss at 60° (%) | Conical mandrel | Reverse impact (kg · cm) | Direct impact (kg · cm) | Erichsen embossing (mm) |
|---|---|---|---|---|---|---|---|---|
| 20 | 90/10 |      | 200 | 87 | —      | 0  | 0  | 0.7 |
| 21 | 90/10 | 0.1  | 180 | 90 | —      | 0  | 0  | 1.1 |
|    |       |      | 200 | 88 | passes | 80 | 80 | 9.5 |
| 22 | 90/10 |      | 200 | 88 | —      | 0  | 0  | 1.1 |
| 23 | 90/10 | 0.12 | 180 | 86 | —      | 0  | 0  | 0.4 |

TABLE IV-continued

Characteristics of the paint coatings (for comparison).

| Polyester of example No. | Polyester/ TGIC ratio | % by weight of crosslinking catalyst | Curing temperature (°C.) | Gloss at 60° (%) | Conical mandrel | Reverse impact (kg · cm) | Direct impact (kg · cm) | Erichsen embossing (mm) |
|---|---|---|---|---|---|---|---|---|
| 24 | 90/10 |  | 200 | 85 | passes | 80 | 80 | 8.9 |
|  |  |  | 200 | 87 | — | 0 | 0 | 4.6 |
| 25 | 90/10 | 0.09 | 180 | 88 | — | 0 | 0 | 1.0 |
|  |  |  | 200 | 88 | passes | 80 | 80 | 10.0 |
| 26 | 93/7 |  | 200 | 86 | — | 0 | 0 | 0.6 |
| 27 | 93/7 | 0.2 | 180 | 90 | — | 0 | 0 | 0 |
|  |  |  | 200 | 89 | passes | 40 | 60 | 9.1 |
| 28 | 90/10 |  | 200 | 90 | — | 0 | 0 | 0 |
| 29 | 90/10 | 0.15 | 180 | 89 | — | 0 | 0 | 1.1 |
|  |  |  | 200 | 91 | passes | 80 | 80 | 10.2 |

Table III shows very clearly that the powder compositions according to the invention give coatings having excellent mechanical and gloss properties comparable to those obtained with powder compositions prepared from conventional polyesters of the prior art based on aromatic acids. It can also be seen that these advantageous properties can be obtained even if curing takes place at low temperature, for example at 160° C. (examples 3, 6 and 13) or at 180° C. (examples 8, 11, 12, 14, 15, 17 and 18), provided, however, that a small amount of a crosslinking agent is added. It is also noticed that these excellent properties can also be obtained without addition of a crosslinking catalyst provided curing is carried out at 200° C.

On the other hand, Table IV shows that the polyester has to be prepared in two steps. Indeed, if the polyester is prepared in one step from practically the same starting materials (examples 20 to 27) or according to U.S. Pat. No. 5,097,006 (assigned to the assignee of the present invention) (examples 28 and 29), it can be seen that good mechanical properties (flexibility and impact resistance) can only be obtained on condition that a certain mount of crosslinking catalyst is always added and moreover that the curing of the coating takes place at a temperature of 200° C. (examples 21, 23, 25, 27 and 29).

EXAMPLE 31

Weatherability of the Coatings

The weatherability measurements have been carried out in a very severe environment, namely by means of the accelerated aging testing apparatus QUV (from Q Panel Co.), wherein the coated samples are subjected to intermittent effects of condensation (4 hours at 40° C.) as well as to the damaging effects due to light simulated by fluorescent UV lamps (UVB-313 lamps, for 8 hours at 60° C.).

In Table V, the values of gloss measured at an angle of 60° according to ASTM D 523, for 70 successive days, at the rate of 2 cycles per 24 hours, are given for the coatings obtained with the polyester of example 3 according to the invention and with the polyester of example 21, not according to the invention. By way of comparison, a commercially available polyester based on aromatic acids, not according to the invention, is also included in the Table. This polyester is prepared in conventional manner in two steps. First, 572 parts of terephthalic acid, 30 parts of adipic acid and 422 parts of neopentyl glycol are reacted in the presence of 2.2 parts of dibutyltin oxide as an esterification catalyst and 0.9 part of antioxidant; a hydroxyl-terminated polyester with a hydroxyl number of 50 mg KOH/g is obtained. Then this polyester is esterified with 120 parts of isophthalic acid to form a carboxyl-terminated polyester and 0.9 part of crosslinking catalyst is added. The final polyester has an acid number of 35 mg KOH/g.

The coatings tested have been prepared as described in example 30 (with a 93/7 formulation for the commercial polyester). Curing time:

polyester of example 3: 10 minutes at 160° C., polyester of example 21: 10 minutes at 200° C., commercial polyester based on aromatic acids: 10 minutes at 200° C.

TABLE V

60° Gloss change with time.

| Number of days | Compositions | | |
|---|---|---|---|
|  | Polyester of example 3 | Polyester of example 21 (1) | Aromatic polyester (1) |
| 0 | 94 | 92 | 95 |
| 7 | 92 | 91 | 100 |
| 14 | 97 | 93 | 59 |
| 21 | 100 | 99 | 62 |
| 28 | 97 | 100 | 55 |
| 35 | 82 | 87 | 47 |
| 42 | 57 | 65 | 50 |
| 49 | 53 | 60 |  |
| 56 | 67 | 59 |  |
| 63 | 58 | 50 |  |
| 70 | 50 | 47 |  |

(1) polyester used for comparison.

The results of Table V show that the polyester of example 3 according to the invention provides coatings with a remarkable weatherability, which is quite superior to that of a commercial polyester essentially constituted of aromatic acids. It will further be noticed that the excellent behavior of the coating according to the invention towards weathering is obtained at a much lower curing temperature, since it is only of 160° C. (instead of 200° C. for the comparison coatings).

EXAMPLE 32

Resistance to Industrially Polluting Atmospheres

This resistance test has been conducted in a damp atmosphere containing sulfur dioxide according to DIN 50018. In this test, the coating obtained on the one hand with a powder formulated with the polyester of example 1 (according to the invention) is compared on the other hand with those obtained with the powders formulated respectively with the polyester of example 20 prepared in one step and with the commercial polyester based on aromatic acids (not according to the invention), the composition of which is described in example 31.

The three polyesters were formulated into a paint having the following composition:

polyester: 604 parts triglycidyl isocyanurate (Araldite PT810 from CIBA-GEIGY): 66 parts titanium dioxide (Kronos 2160 from KRONOS): 9 parts Sicomin Yellow L1523 (BASF): 126 parts Heliogene Blue (BASF): 18 parts Flammrust 101 (DEGUSSA): 6 parts barium sulfate (Blanc fixe N from SACHTLEBEN): 83 parts Durcal 5 (OMYA): 88.5 parts flow control agent (Resiflow PV5 from WORLEE): 10 parts degassing agent (benzoin from BASF): 3.5 parts The powder compositions are prepared according to the method described in example 30. After application on the articles to be coated under the same conditions as in example 30, the coatings deposited are cured at 200° C. for 10 minutes, the film thickness varying from 50 to 80 microns.

The changes due to hydrolysis in an acid environment are expressed by the variation of the parameter b*, indicating the yellow tint according to the CIEL, a*, b* scale. These values have been measured using a COLORQUEST spectrophotometer.

The results obtained in this test are reported in Table VI. This Table shows that the powder composition containing the polyester of example according to the invention gives coatings, the resistance of which to industrial polluting atmospheres is markedly superior to that of the corresponding coatings obtained from the polyester of example 20 (comparative) prepared in one step.

Table VI shows in addition that this resistance is practically equal to the resistance of the coatings obtained with the powder composition containing the commercial polyester based on aromatic acids.

This test according to DIN 50018 has also been carried out on coatings marked with a St Andrew's cross. The fillform corrosion of the powder composition containing the polyester of example 1 according to the invention, remains within the limits of the specifications of the QUALICOAT and GSB types.

TABLE VI

Resistance to industrial pollution atmosphere.

| | Compositions | | |
|---|---|---|---|
| Number of cycles | Polyester of example 1 Δb* | Polyester of example 20 (1) Δb* | Aromatic polyester (1) Δb* |
| 0 | 0 | 0 | 0 |
| 1 | 0.23 | 1.23 | 0 |
| 2 | 0.69 | 2.05 | 0.60 |
| 3 | 0.91 | 3.57 | 1.47 |
| 4 | 1.30 | 4.74 | 1.35 |
| 5 | 1.57 | 4.82 | 1.47 |
| 6 | 2.01 | 6.06 | 1.90 |
| 7 | 2.40 | 7.11 | 2.15 |

TABLE VI-continued

Resistance to industrial pollution atmosphere.

| | Compositions | | |
|---|---|---|---|
| Number of cycles | Polyester of example 1 Δb* | Polyester of example 20 (1) Δb* | Aromatic polyester (1) Δb* |
| 8 | 2.43 | 8.22 | 2.34 |
| 9 | 2.82 | 8.82 | 2.76 |
| 10 | 3.01 | 8.83 | 2.95 |
| 11 | 3.38 | 8.35 | 3.29 |
| 12 | 4.64 | 8.87 | 3.74 |
| 13 | 4.01 | 10.25 | 4.01 |
| 14 | 4.45 | 11.36 | 4.23 |
| 15 | 4.14 | 13.52 | 4.44 |
| 16 | 4.83 | | 4.68 |
| 17 | 5.01 | | 4.91 |
| 18 | 5.55 | | 5.30 |
| 19 | 6.10 | | 5.80 |
| 20 | 6.69 | | 6.30 |
| 21 | 6.82 | | 6.54 |
| 22 | 7.15 | | 6.91 |
| 23 | 7.74 | | 7.35 |
| 24 | 8.20 | | 7.68 |

(1) polyester used for comparison.

What is claimed is:

1. A thermosetting powder composition comprising (A) a carboxyl-terminated polyester consisting essentially of the reaction product of
   (a) an all aliphatic hydroxyl-terminated polyester prepared from 1,4-cyclohexanedicarboxylic acid as the sole acid component and as the alcohol component
      (1) from 10 to 100 equivalent % of a cycloaliphatic diol, and
      (2) from 90 to 0 equivalent % of at least one straight or branched chain aliphatic polyol having 2 to 12 carbon atoms, with
   (b) an aliphatic and/or aromatic dicarboxylic acid or the corresponding anhydride, the amount of 1,4-cyclohexanedicarboxylic acid of the carboxyl-terminated polyester being of from 50 to 90 mole % with respect to the total amount of carboxylic acids, and (B) a polyepoxy compound.

2. The composition of claim 1, wherein the aliphatic hydroxyl-terminated polyester (a) has a hydroxyl number of from 30 to 220 mg KOH/g and a functionality from 2 to 3.

3. The composition of claim 1, wherein the cycloaliphatic diol (1) represents from 30 to 70 equivalent % of the alcohol component.

4. The composition of claim 1, wherein the cycloaliphatic diol (1) is selected from the group consisting of hydrogenated bisphenol A, 1,4-cyclohexanedimethanol, 1,4-cyclohexanediol, 2,2,4,4-tetramethyl-1,3-cyclobutanediol, 4,8-bis(hydroxymethyl)tricyclo[$5.2.1.0^{2,6}$]decane and mixtures thereof.

5. The composition of claim 1, wherein the aliphatic polyol (2) represents from 30 to 70 equivalent % of the alcohol component.

6. The composition of claim 1, wherein the aliphatic polyol (2) is selected from the group consisting of ethylene glycol, diethylene glycol, propylene glycol, 1,4-butanediol, 1,6-hexanediol, neopentyl glycol, trimethylolpropane, ditrimethylolpropane, trimethylolethane, pentaerythritol, 1,3,5-tris(2-hydroxyethyl)-1,3,5-triazine-2,4,6(1H,3H,5H)-trione and mixtures thereof.

7. The composition of claim 1, wherein the dicarboxylic acid or the corresponding anhydride (b) is selected from the group consisting of succinic acid, glutaric acid, adipic acid, pimelic acid, azelaic acid, maleic acid, fumaric acid, isophthalic acid, succinic anhydride, maleic anhydride and mixtures thereof.

8. The composition of claim 7, wherein the dicarboxylic acid (b) is adipic acid or isophthalic acid.

9. The composition of claim 1, wherein the carboxyl-terminated polyester has an acid number of from 25 to 70 mg KOH/g and a functionality from 2 to 4.

10. The composition of claim 1, wherein the carboxyl-terminated polyester has a number-average molecular weight between 2,000 and 10,000.

11. The composition of claim 1, wherein the polyepoxy compound is a solid monomer compound or a solid polymer resin at room temperature, containing on average at least two epoxy groups.

12. The composition of claim 1, wherein the polyepoxy compound is triglycidyl isocyanurate.

13. The composition of claim 1, wherein the polyepoxy compound is used in an amount of from 0.7 to 1.3 equivalents of epoxy groups per equivalent of carboxyl groups in the carboxyl-terminated polyester.

14. The composition of claim 1, wherein the polyepoxy compound is used in an amount of from 0.95 to 1.05 equivalents of epoxy groups per equivalent of carboxyl groups in the carboxyl-terminated polyester.

15. The composition of claim 1, further comprising up to 1% by weight with respect to the weight of the polyester of a crosslinking catalyst selected from the group consisting of amines, phosphines, ammonium salts and phosphonium salts.

16. The composition of claim 15, wherein the crosslinking catalyst is ethyltriphenylphosphonium bromide.

17. The composition of claim 1, further comprising up to 10% by weight with respect to the weight of the polyester of at least one stabilizer selected from the group consisting of ultraviolet light absorbing compounds, sterically hindered amines, phenolic antioxidants and phosphonite or phosphite type compounds.

* * * * *